(12) United States Patent
Uchiyama et al.

(10) Patent No.: US 7,204,088 B2
(45) Date of Patent: Apr. 17, 2007

(54) LEVER DEVICE FOR HYDRAULIC OPERATION

(75) Inventors: Mikio Uchiyama, Saitama (JP); Kazuhiko Gogo, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 11/127,283

(22) Filed: May 12, 2005

(65) Prior Publication Data

US 2005/0252370 A1  Nov. 17, 2005

(30) Foreign Application Priority Data

May 14, 2004 (JP) ............................. 2004-145209
Apr. 22, 2005 (JP) ............................. 2005-125347

(51) Int. Cl.
*B60T 7/08* (2006.01)

(52) U.S. Cl. ....................................................... 60/594

(58) Field of Classification Search .................. 60/594, 60/584
See application file for complete search history.

(56) References Cited

U.S. PATENT DOCUMENTS 4,560,049 A * 12/1985 Uchibaba et al. ......... 192/85 R
4,635,442 A * 1/1987 Bass ............................ 60/594
4,779,482 A * 10/1988 Kawaguchi ................... 74/523
5,050,381 A * 9/1991 Matsuno et al. ............... 60/594
6,457,378 B2 * 10/2002 Hatakoshi et al. ............ 74/525
6,739,133 B2 * 5/2004 Barnett ........................ 60/594
6,804,961 B2 * 10/2004 Lumpkin ...................... 60/594

FOREIGN PATENT DOCUMENTS

DE  85 21 768.9 U1  10/1985
JP  10-129567 A  5/1998

* cited by examiner

*Primary Examiner*—Michael Leslie
(74) *Attorney, Agent, or Firm*—Birch, Stewart, Kolasch & Birch, LLP

(57) ABSTRACT

In a lever device for a hydraulic operation where hydraulic pressure is generated in a master cylinder by rotation of a lever, to make invariable an operation of a pushrod, which operates a piston of the master cylinder by being pushed at one end thereof by an adjuster of the lever, irrespectively of an adjustment of the adjuster. The lever is supported by a rotational shaft to be rotatable around the rotational shaft relative to the master cylinder, while a knocker member separate from the lever is supported to be coaxially rotatable. A knocker portion of the knocker member receives an end of the pushrod, which operates the piston. A positional relationship between the pushrod and the knocker portion is made invariable irrespectively of a change in a distance between the adjuster and the knocker portion by an adjustment of the adjuster.

11 Claims, 12 Drawing Sheets

LEVER DEVICE FOR HYDRAULIC OPERATION

CROSS-REFERENCE TO RELATED APPLICATIONS

The present non-provisional application claims priority under 35 USC 119 to Japanese Patent Application Nos. 2004-145209 and 2005-125347 filed on May 14, 2004 and Apr. 22, 2005, respectively, the entire contents thereof is hereby incorporated by reference.

BACKGROUND OF THE INVENTION

1. Field of the Invention

The present invention relates to a lever device for a hydraulic operation, suitable for use, for example, in a hydraulic brake of a motorcycle.

2. Description of Background Art

A lever device for a hydraulic operation of a hydraulic brake of a motorcycle includes a hydraulic master cylinder attached to a handlebar, and a lever attached to the master cylinder such that the lever is rotatable relatively to the master cylinder. The lever device is constructed such that a pushrod for moving a piston of the master cylinder and an adjuster of the lever are connected by caulking or otherwise, and a rotational of the lever makes the adjuster push the pushrod to thereby move the piston, generating pressure in the mater cylinder. See, Japanese Patent Application No. 129567/1998.

A projection of an end of the adjuster with respect to the pushrod is adjustable to make it possible to adjust a play of the lever. However, with a change in the amount of projection, a path of a turn of the end changes, which undesirably changes an operation stroke of the pushrod. Therefore, it is desired that the operation of the pushrod should not be affected by the adjustment of the adjuster.

SUMMARY AND OBJECTS OF THE INVENTION

To solve the above problem, an arrangement of an embodiment of the invention provides a lever device for a hydraulic operation that includes a piston which linearly moves in a hydraulic cylinder. A lever is supported such that the lever is rotatable relatively to the hydraulic cylinder. A pushrod is disposed to push the piston by being pushed by a pushing portion of the lever when turned. The lever device further includes a knocker member which pushes an end of the pushrod. The lever is supported to be rotatable with respect to the hydraulic cylinder. An adjusting mechanism is provided which can change a distance between the knocker member and the pushing portion.

An arrangement of the present invention provides the lever device together with the knocker member that includes a stopper which limits a return position of the knocker member.

An arrangement of the present invention provides the lever device together with the knocker member that are supported on the same rotational axis.

An arrangement of the present invention provides the lever device with a pivotal portion of the lever that includes two segments separated in a direction of a rotational axis. A pivotal portion of the knocker member is interposed between the separated two segments.

An arrangement of the present invention provides the lever device with an elastic member for rotationalally biasing the lever in a direction to generate pressure in the hydraulic cylinder. The elastic member is disposed between the lever and the hydraulic cylinder.

An arrangement of the present invention provides the lever device together the knocker member which includes a knocker portion for pushing an end of the pushrod. The knocker portion includes a projecting portion which covers a part of the pushrod in a manner to sandwich the part.

According to the present invention, the knocker member is provided separate from the lever. The knocker member is rotatable independently of the rotational of the lever, and is formed separately from the adjuster. Thus, even when an adjustment of the adjuster is made, the path of rotational of the knocker member does not change, preventing the influence of the adjuster on the operation of the pushrod and the piston. Further, the coupling between the pushrod and the knocker member is maintained even when the lever is rotated by receiving an excessive load in a frontward direction. Still further, since the pushrod and the knocker member need not be coupled with each other by caulking as seen in the conventional lever device, it is easy to assemble the lever device.

According to the present invention, a stopper is provided which limits the return position of the knocker member. Thus, a rotational of the knocker member in its returning direction to a degree beyond necessity can be inhibited, further ensuring the maintenance of the coupling between the knocker member and the pushrod.

According to the present invention, the knocker member and the lever are supported on the same rotational axis, simplifying the structure of the lever device, as well as facilitating the assembling of the lever device.

According to the present invention, the pivotal portion of the knocker member is interposed between the two segments of the pivotal portion of the lever that are separated in the direction of the rotationalal axis, thereby preventing a deformation of the pivotal portion of the knocker member by means of the pivotal portion of the lever. Thus, a sufficient rigidity of the knocker member can be maintained even when a further weight saving of the knocker member is realized.

According to the present invention, since the elastic member is disposed between the lever and the hydraulic cylinder, while the lever device is in a normal state where a rider's hand is off the lever, the lever is returned to its neutral position by being rotationalally biased by the elastic member in the direction to generate pressure in the hydraulic cylinder to hold the knocker member in contact with the pushrod, as well as to prevent the lever and the knocker member from wobbling.

According to the present invention, since the projecting portion of the knocker portion covers a part of the pushrod in a manner to sandwich the part, the pushrod tends to not disengage from the knocker portion upon rotational of the knocker portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
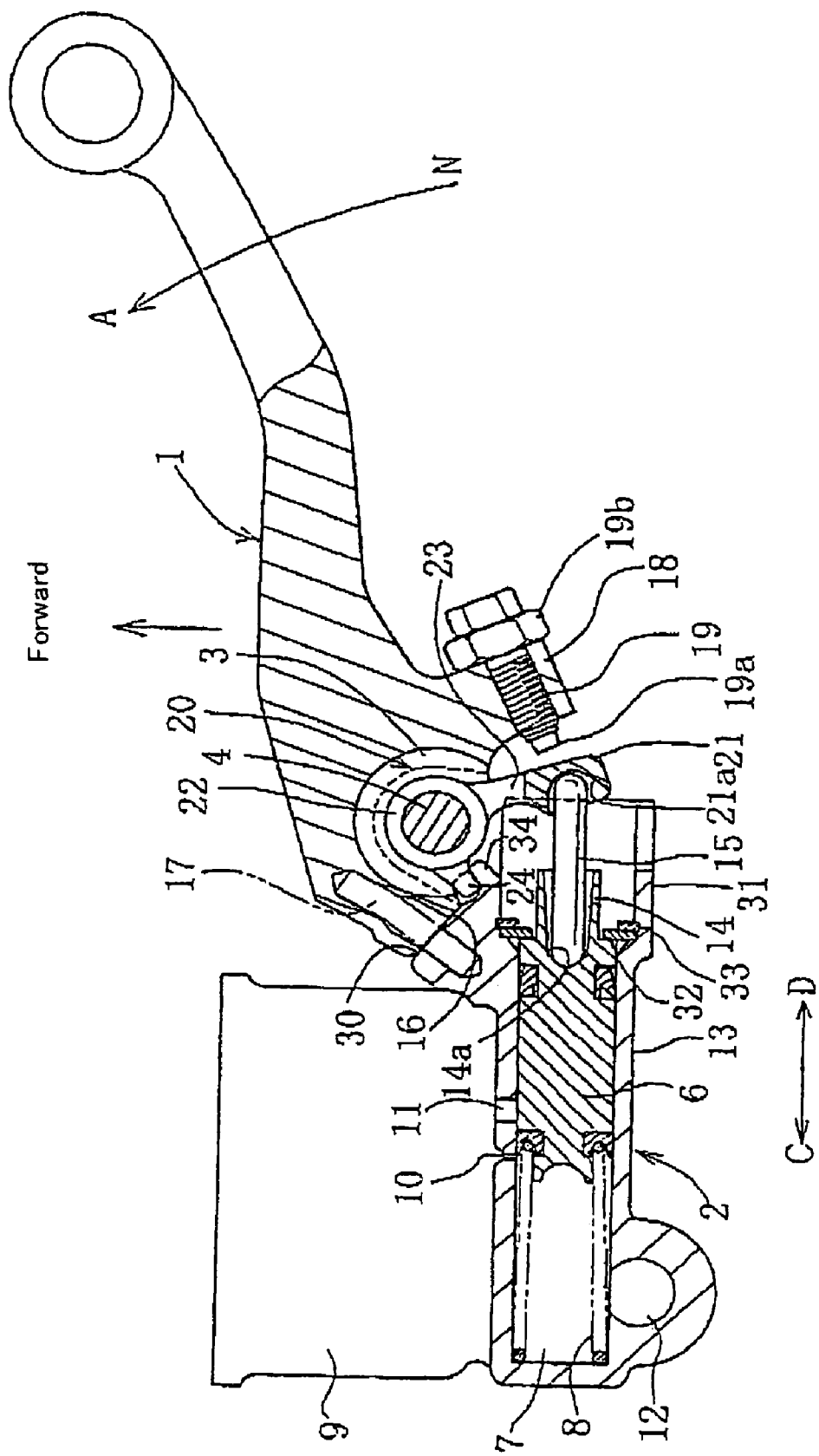
FIG. 1 is a cross-sectional view of a right lever of a motorcycle.

Hereinafter, preferred embodiments will be described based on the drawings. FIGS. 1 to 5 show a first embodiment applied to a structure of a brake operating lever for a hydraulic brake of a motorcycle. The parts identical with those of the above-described conventional lever device will be denoted by the same reference numerals.

Figure 8:
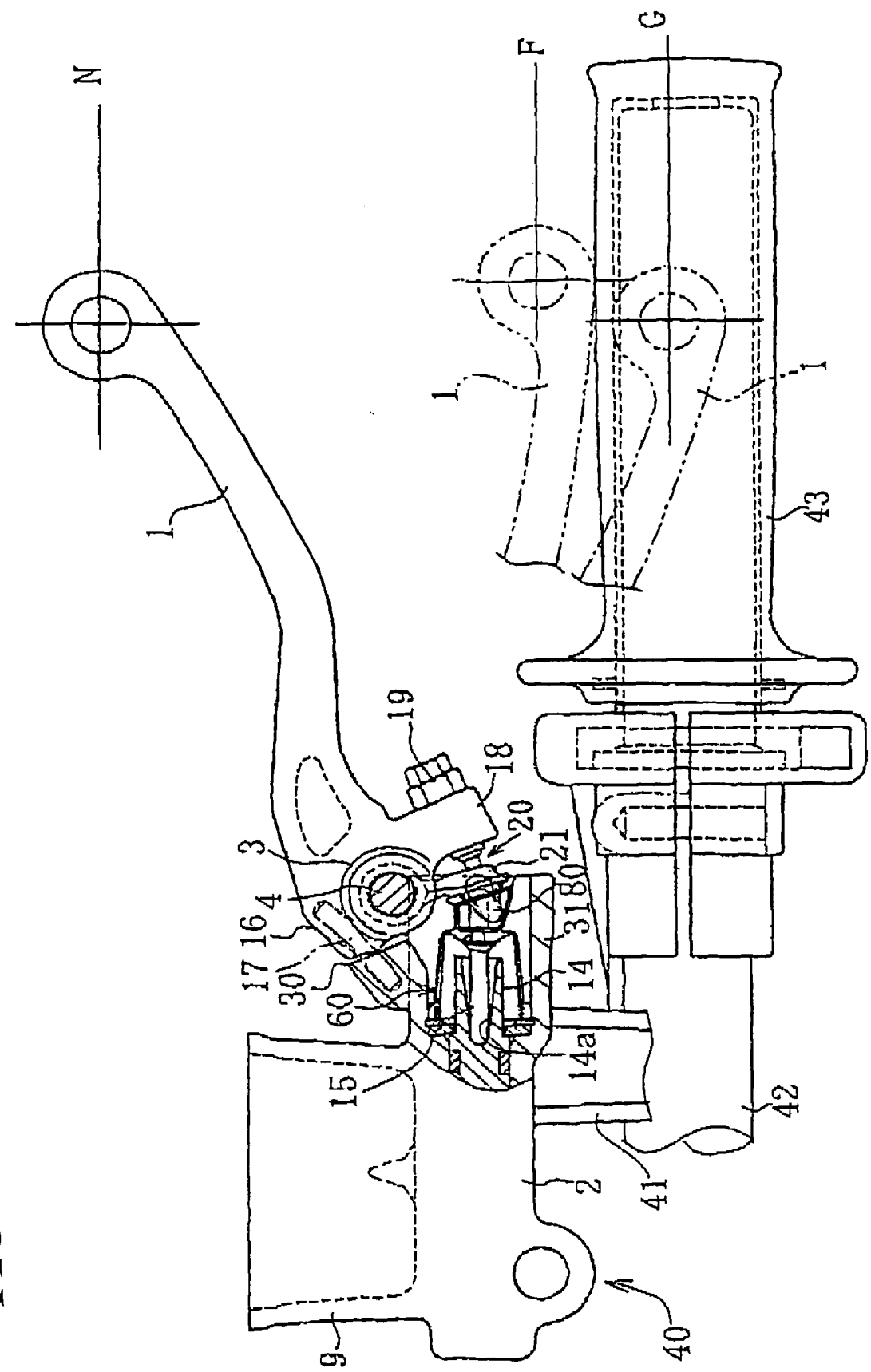
FIG. 8 is a view corresponding to FIG. 1, showing a lever according to a fourth embodiment.

FIG. 1 is a cross-sectional view of a lever 1 attached to a right-hand side of a handlebar for a motorcycle (see FIG. 8). By operating the lever 1, hydraulic pressure is generated in a master cylinder 2 of a front brake.

The lever 1 is supported at its base portion 3 by a rotational shaft 4 to be pivotable around the rotationalal shaft 4 relatively to a lever holder 5 formed integrally with the master cylinder 2. In FIG. 1, a bidirectional arrow A-B indicates a direction of rotational of the lever 1. The direction A indicates a direction to return the lever 1 to its original position (a direction to release hydraulic pressure), while the direction B indicates a direction to operate the lever (a direction to generate hydraulic pressure). Reference symbol N indicates a neutral position at which the lever 1 is placed in a non-operation state (normal state) where no rotationalal force is applied when a rider gets his or her hand off the lever 1. FIG. 1 shows the lever 1 placed at this normal state.

The master cylinder 2 is open at one of its opposite ends on the side of the rotational shaft 4. A piston 6 is fitted in the master cylinder 2 to be slidable in the direction indicated by a bidirectional arrow C-D which is an axial direction of the master cylinder 2, so that the piston 6 is linearly movable. The piston 6 is biased or pushed back in the direction D by a return spring 8 which is accommodated in a pressure chamber 7. The pressure chamber 7 is in communication with a reservoir tank 9 which is formed integrally with the master cylinder 2, via a suction port 10, so that a working fluid is supplied from the reservoir tank 9 to the pressure chamber 7. A return port 11 is provided to return the working fluid from the master cylinder 2 to the reservoir tank 9.

The pressure chamber 7 is in communication with a discharge opening 12 formed integrally with a wall of the master cylinder 2. When pressure is applied to the pressure chamber 7 by the piston 6, the working fluid in the pressure chamber 7 is delivered from the discharge opening 12, to a brake caliper (not shown) of a front brake (not shown) via a brake hose (not shown), so as to operate the front brake.

An end of the piston 6 constitutes a pressing portion 13 from which a cylindrical rod holder 14, which is integrally formed with the pressing portion 13, projects. One of opposite ends of a pushrod 15 is fitted in a hole 14a of the cylindrical rod holder 14, and the other end of the pushrod 15 is fitted in a hole 21a formed in a knocker portion 21 of an knocker member 20.

Each of two longitudinal ends of the pushrod 15 has a spherical shape, and can be moved in sliding contact with the hole 14a, 21a. The pushrod 15 can sway with respect to an axis line of the piston 6. Each of the holes 14a, 21a has the shape of a bottomed, tapered hole, whose internal diameter increases toward their open side, so as to enable the sway of the piston 6.

The knocker member 20 is a member separate from the lever 1, and is supported around the rotational shaft 4, coaxially with the base portion 3. The knocker member 20 has a ring portion 22 through which the rotational shaft 4 extends, an arm portion 23 integrally extending from the ring portion 22 in a radial direction of the ring portion 22, and a stopper projection 24. The arm portion 23 and the stopper projection 24 extend in respective directions that make an angle of substantially 90 degrees.

A stopper projection 34 is disposed at an end of a stopper shoulder 30 of the master cylinder 2 to project toward the rotational shaft 4. The stopper projection 24 can be brought into abutting contact with a side surface of the stopper projection 34 in the direction of rotational of the projection 24 (see FIG. 5). In the stopper shoulder 30, a clearance recess is formed at a base portion of the stopper projection 34. The stopper shoulder 30 is obliquely formed as a part of the master cylinder 2 in the vicinity of a base portion of the reservoir tank 9, and has a thickness corresponding to a distance between a pair of parts of the lever holder 5 that are spaced in an axial direction of the rotationalal shaft 4. (See FIG. 3.)

A stopper end 16, which is an end of the base portion 3 of the lever 1, can be brought into abutting contact with the stopper shoulder 30. This abutting contact is made when a large load is applied to the lever 1 in a frontward direction (the direction of the arrow A). However, a slight clearance is normally formed by an adjusting spring 17.

The adjusting spring 17, constituting the elastic member of the invention, may be a coil spring. Opposite ends of the adjusting spring 17 are respectively fitted in holes 30a, 16a formed in the stopper shoulder 30 and the stopper end 16, respectively, so as to bias or rotate the lever 1 in the direction of the arrow B to thereby form a given clearance. The biasing force of the adjusting spring 17 is set to be smaller than that of the return spring 8 in its returning direction. Therefore, in the normal state where the rider's hand is off the lever 1, the lever 1 is returned to its neutral position by the return spring 8 and held in the neutral position N due to a power balance between the adjusting spring 17 and the return spring 8, so as to hold the knocker member 20 in contact with the pushrod 15 as well as prevent the lever and the knocker member from wobbling.

From the base portion 3 of the lever 1, a pushing portion 18 integrally extends along the arm portion 23. An adjuster 19 is inserted through a nut portion formed through the pushing portion 18 to engage a screw portion formed on an outer circumference of the adjuster 19 with the nut portion, thereby making a length of projection of an end 19a thereof freely adjustable. The adjuster 19 is fixed by a lock nut 19b at an adjusting position.

The adjuster 19 is adjusted such that its end 19a is in contact with a knocker portion 21 while the lever 1 is placed at its normal position. At this normal position, the adjuster 19 does not push the piston 6 in via the pushrod 15, hydraulic pressure is not generated in the pressure chamber 7.

The cylindrical holder 14, the pushrod 15, the knocker portion 21, and others are disposed inside a large-diameter portion 31 extending from an end of the master cylinder 2, and enclosed in the large-diameter portion 31. Stopper rings 32, 33 are disposed in the large-diameter portion 31 to prevent the piston 6 from coming off.

Figure 2:
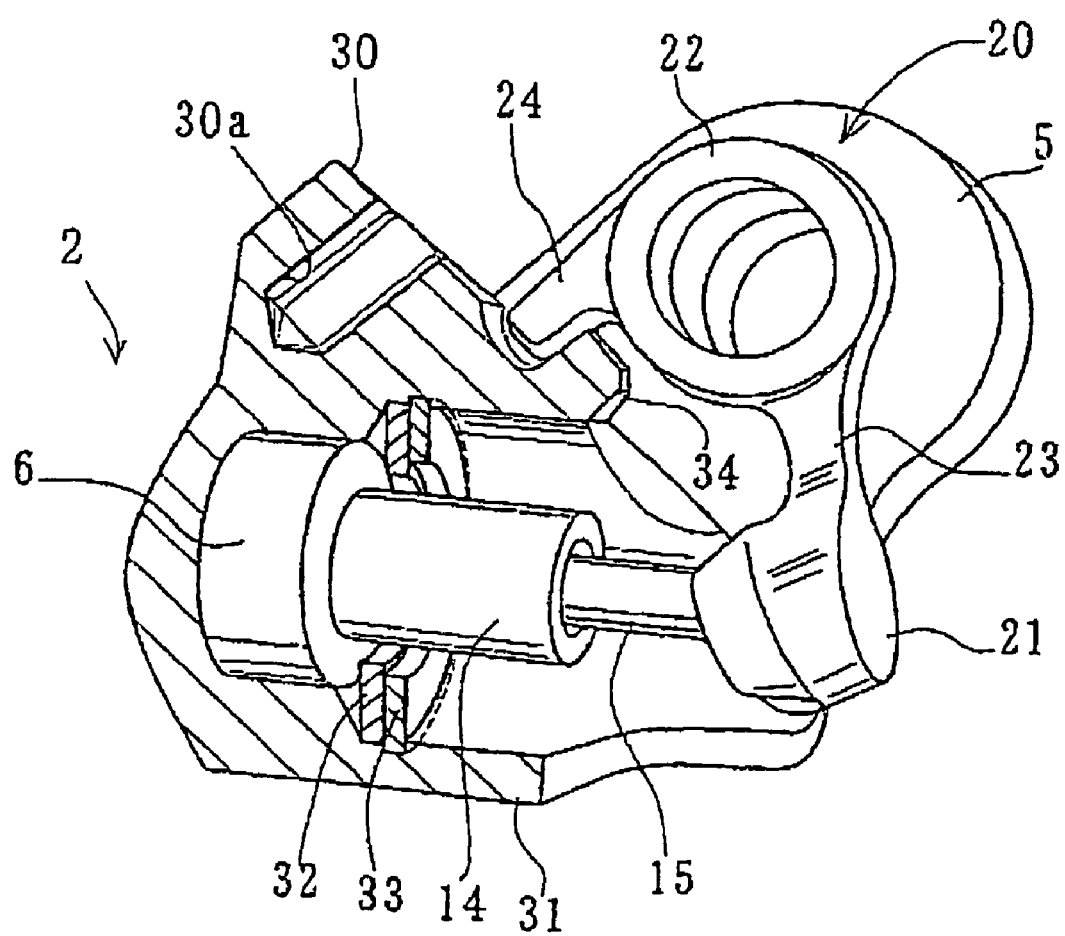
FIG. 2 is a perspective view showing a relationship between a pushrod and a stopper end.

FIG. 2 is a perspective view showing a relationship between the pushrod 15 and the knocker member 20. The knocker member 20 is rotatable independently of the lever 1, and the stopper projection 24 is constructed to stop the rotational of the knocker member 20 when a large load is applied to the lever 1 in the frontward direction.

A side surface of the stopper projection 24 is brought into abutting contact with the stopper projection 34 formed in the stopper shoulder 30. This stop position is adjusted such that the end of the pushrod 15 does not come off of the knocker portion 21 (see FIG. 5). The knocker portion 21 is an enlarged portion formed at an end of the arm portion 23, and a generally bowl-shaped hole 21a is formed in the enlarged portion (see FIG. 1).

Figure 3:
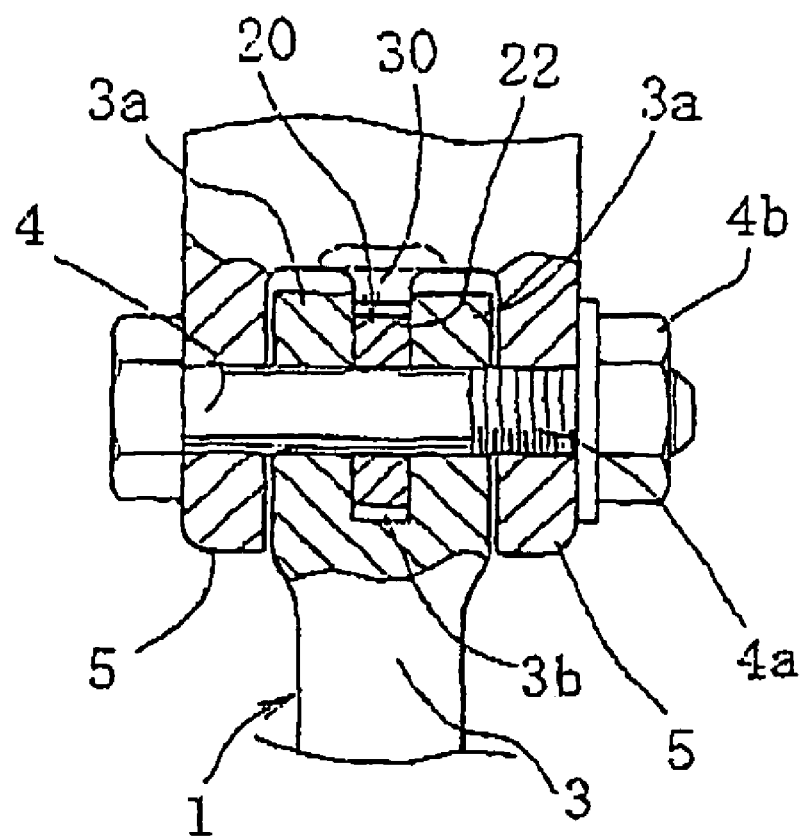
FIG. 3 is a view showing a connecting portion between a lever holder and a base portion as seen in a direction of an arrow E in FIG. 1.

FIG. 3 is a view showing a connecting portion between the parts of the lever holder 5 and the base portion 3 that are connected by means of the rotationalal shaft 4, as seen in a direction of an arrow E in FIG. 1. The lever holder 5 is bifurcated to support the rotationalal shaft 4 such that the pair of the parts thereof is positioned on opposite sides of the stopper shoulder 30, respectively. The base portion 3 is fitted between the pair of parts of the lever holder 5.

A part of the base portion 3 which is interposed between the pair of parts of the lever holder 5 is bifurcated into a pair of shaft supporting portions 3a which are separated from each other in the axial direction of the rotational shaft 4. The ring portion 22, as a shaft supporting portion of the knocker member 20, is fitted in a clearance 3b between the pair of shaft supporting portions 3a, 3a. The lever holder 5, shaft supporting portions 3a, 3a, and ring portion 22 are coaxially connected by means of the rotational shaft 4. The rotational axis 4 is a bolt-like member which has at its end a screw portion 4a tightened into a nut 4b.

Figure 4:
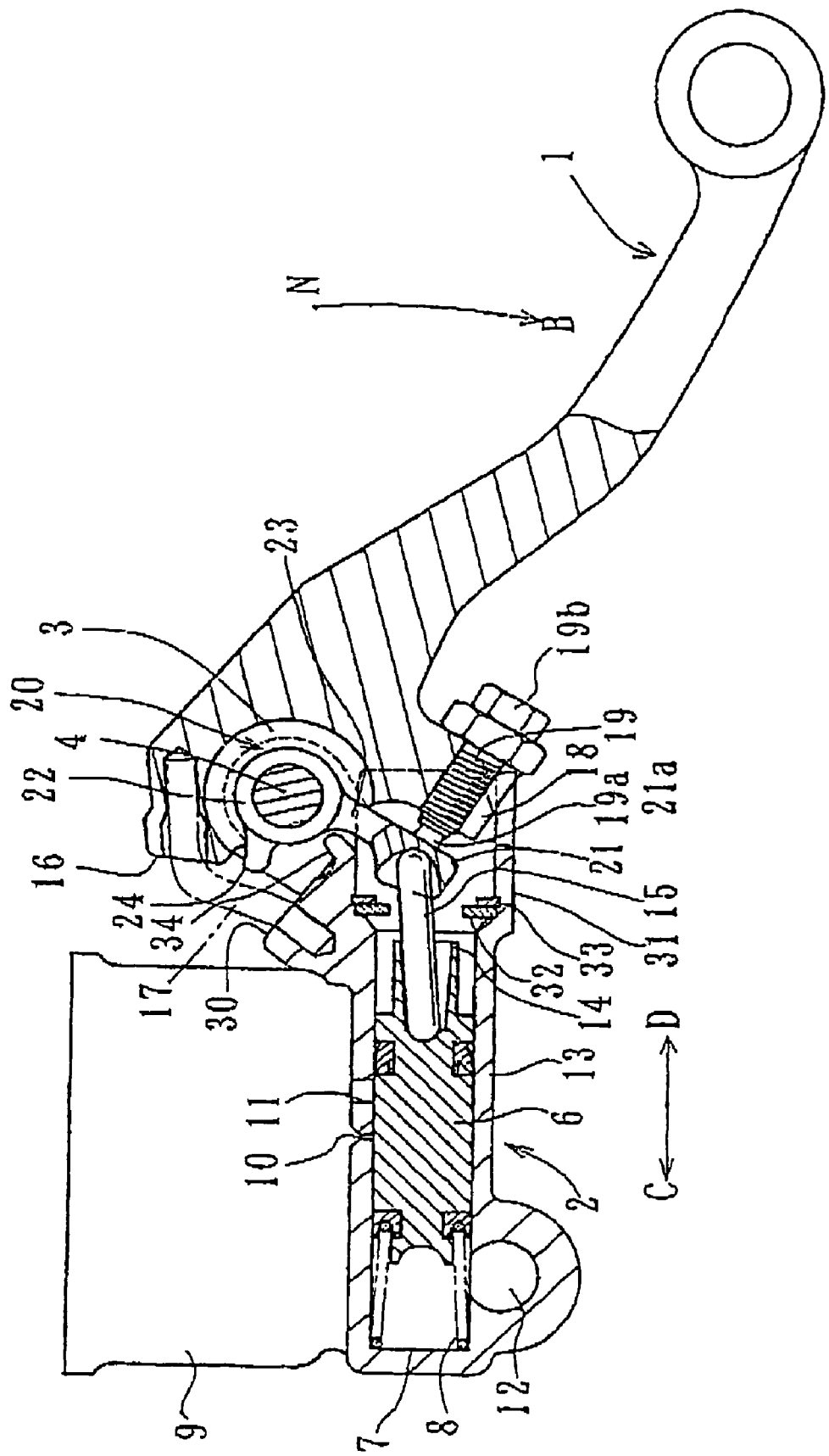
FIG. 4 is a view showing a state of the lever where a brake is operated.
Figure 5:
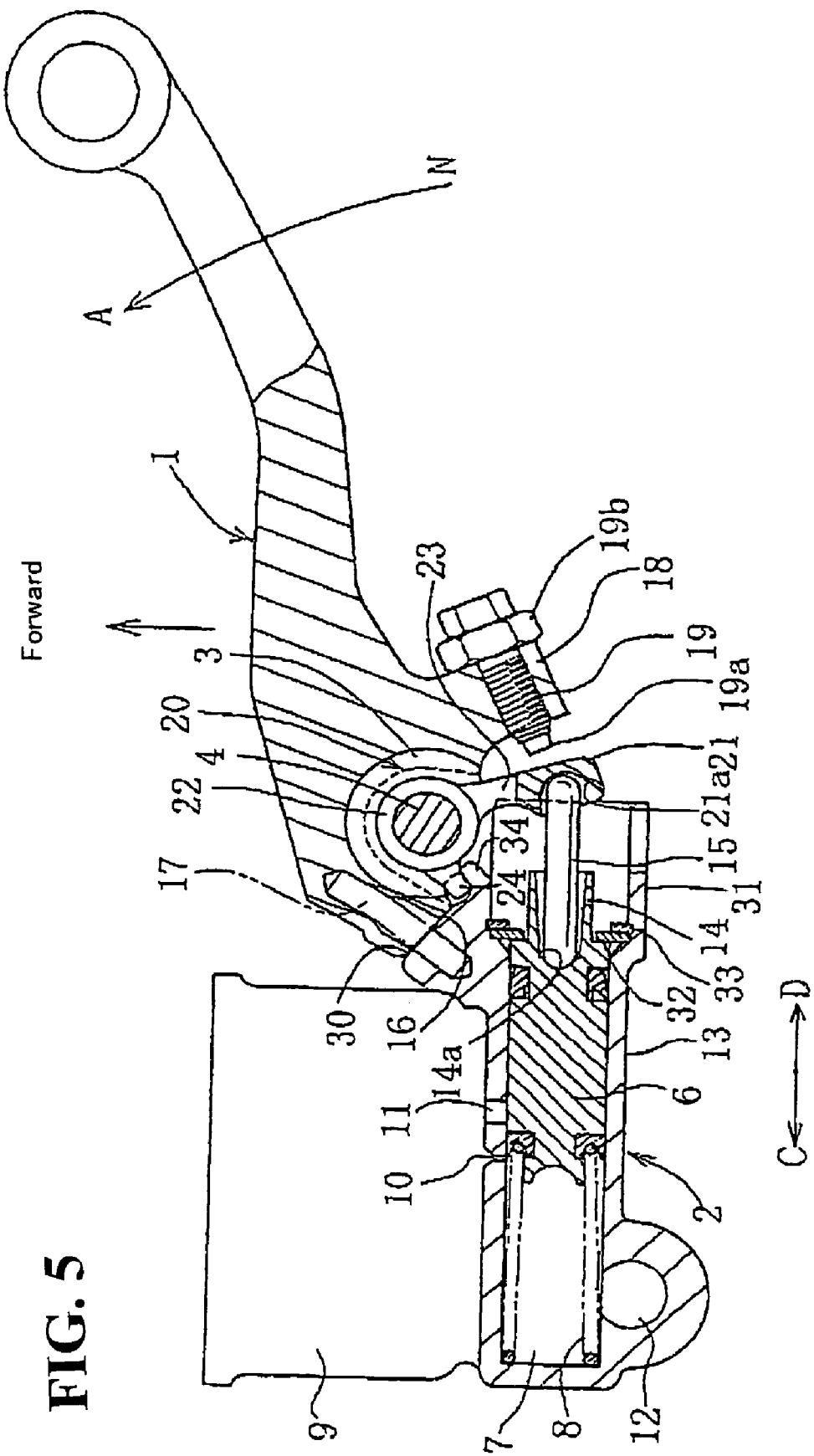
FIG. 5 is a view showing a state where a large load in a frontward direction is applied to the lever.

The following describes an operation of the present embodiment. FIG. 4 shows a state where the lever 1 is operated, while FIG. 5 shows a state where a large load is applied in the frontward direction. First, when the lever 1 is rotated in the direction of the arrow B from the normal state as shown in FIG. 1, the lever 1 is placed in its operational state as shown in FIG. 4, where the pushing portion 18 is rotated in the clockwise direction around the rotational shaft 4 so that the end 19a pushes the knocker portion 21.

Accordingly, the arm portion 23 of the ring portion 22 rotates in the clockwise direction around the rotational shaft 4, and the knocker portion 21 pushes the pushrod 15 in the direction of the arrow C. Hence, the piston 6 moves in the direction of the arrow C, generating hydraulic pressure in the pressure chamber 7. Thus, the hydraulic pressure is applied to the brake caliper of the front brake via the discharge opening 12, to operate the brake.

Although the pushrod 15 is pushed by the knocker portion 21 which rotates around the rotational shaft 4, the positional relationship between the pushrod 15 and the knocker portion 21 is invariable irrespectively of an amount of adjustment of the adjuster 19. Therefore, an influence of an adjustment of the adjuster 19 on the operational stroke of the piston 6 is prevented, thereby being enabled to maintain a constant operational stroke of the piston 6.

Further, since the holes 14a, 21a are such that their diameters are larger on their open side, the sway of the pushrod 15 in each of the holes 14a, 21a is enabled. Still further, since the pushrod 15 can be attached by simply inserting the pushrod 15 into the holes 14a, 21a, the lever is easy to assemble. When the rider releases his or her hand off of the lever 1, the lever holder 5 is pushed back by the return spring 8, and the lever 1 rotates in the counterclockwise direction or the direction of the arrow A to the normal position N, eliminating the generation of the hydraulic pressure in the master cylinder 2.

At this time, since the adjusting spring 17 is rotationally biasing the lever 1 in a direction to generate pressure in the master cylinder 2, the lever 1 can be held in the neutral position N to hold the knocker member 20 in contact with the pushrod 15, as well as prevent the lever and the knocker portion from wobbling.

Then, while the lever 1 is placed in the normal position N as shown in FIG. 1, when a large load in the frontward direction is applied to the lever 1 due to overturning or other reasons, the lever 1 rotates in the direction of the arrow A, to be placed in the position as shown in FIG. 5 where the stopper end 16 of the base portion 3 is brought into contact with the stopper shoulder 30 against the biasing force of the adjusting spring 17. The stopper projection 24 of the knocker member 20 is engaged with the stopper projection 34 of the stopper shoulder 30, thereby inhibiting the rotation of the knocker member 20 beyond a given range.

Hence, even when the end 19a of the adjuster 19 is displaced away from the knocker portion 21, the knocker portion 21 does not rotate in the counterclockwise direction any more, maintaining the state where the end of the pushrod 15 is received. Thus, the disengagement or coming off of the pushrod 15 from the knocker portion 21 is prevented. It is noted that it is not essential to provide the stopper projection 24 to prevent the disengagement or coming off of the pushrod 15. However, the pushrod 15 can be prevented from disengaging or coming off with an enhanced reliability, where the stopper projection 24 is present. Further, by enlarging the knocker portion 21, the disengagement or coming off of the pushrod 15 can be prevented even if the stopper projection 24 is omitted.

Since the knocker member 20 is disposed at the clearance 3b between the pair of shaft supporting portions 3a of the base portion 3, a deformation of the knocker member 20 can be prevented by the pair of shaft supporting portions 3a.

Thus, even when the weight of the knocker member 20 is made relatively small, a deformation thereof can be prevented.

Figure 6:
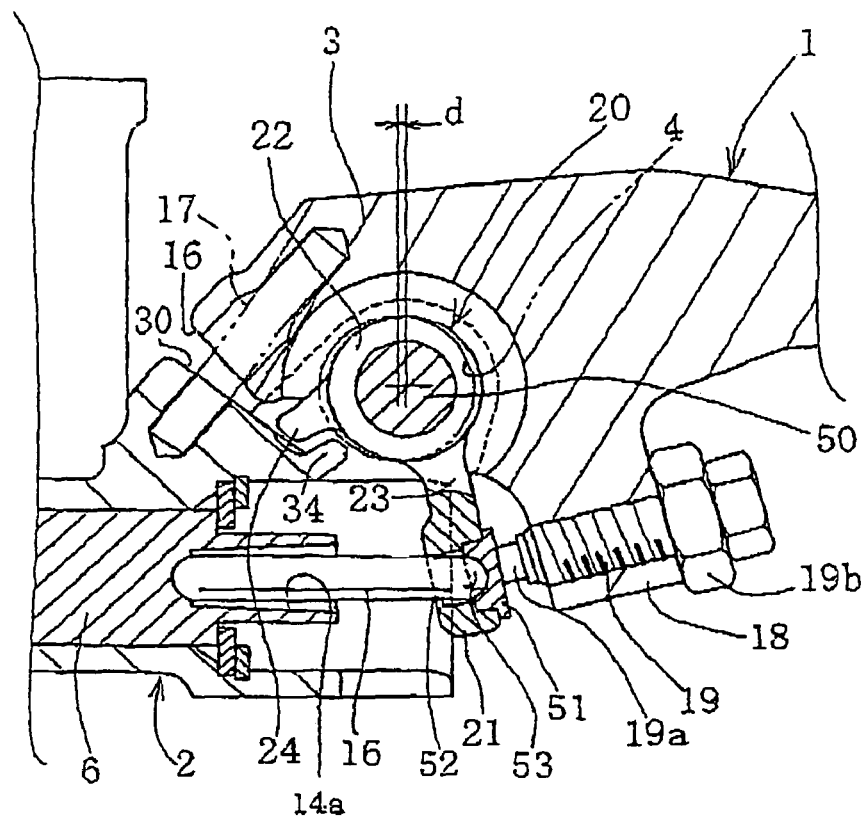
FIG. 6 is a view showing in enlargement a relevant portion of a second embodiment of the invention.

FIG. 6 shows a second embodiment of the invention. In this embodiment, a rotational shaft 50 of the knocker member 20 is different from the rotational shaft 4, such that centers of the respective shafts 50, 4 are deviated by a dimension d, and a through-hole 52 formed in the knocker portion 21 is closed by a separately formed cap 51. The other parts are identical with those of the above-described first embodiment, and the same reference numerals are used for denoting the identical parts.

By the arrangement of the second embodiment, a path of rotation of the knocker member 20 is differentiated from that of the lever 1, so that a path suitable for the operation of the pushrod 15 can be employed. Further, since the order of attaching the knocker member 20 to the base portion 3, and an object to which the knocker member 20 is attached, can be changed. For instance, the knocker member 20 may be attached to an external side of the base portion 3 and the lever holder 5.

In addition, since the cap 51 which is a separately formed member is used in the knocker portion 21, an accommodating portion for accommodating the pushrod 15 can be easily formed by providing the through-hole 52 in the form of a straight hole of a relatively large diameter capable of allowing the sway of the pushrod 15, and attaching thereto the cap 51 having a spherical recess 53, by caulking or otherwise.

Further, by forming the cap 51 with a material having an excellent wear resistance, which is different from the material forming the knocker portion 21, the durability of the cap 51 with respect to the contact with the end 19a can be improved. In addition, it is possible to locally change the material only at the portion where the end 19a contacts, thereby reducing the cost.

Figure 7:
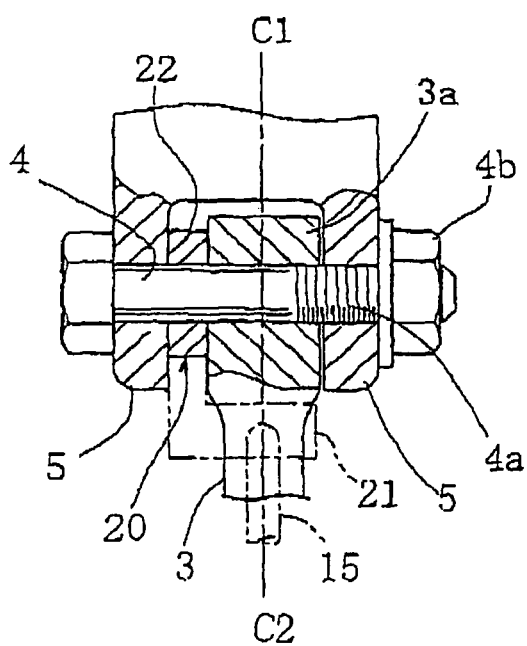
FIG. 7 is a view showing in enlargement a relevant portion of a third embodiment of the invention.

FIG. 7 shows a third embodiment of the invention relating to the attaching of the knocker member. In the third embodiment, the shaft supporting portion 3a which is a part of the base portion 3 of the lever does not include two portions. In this embodiment, the ring portion 22 of the knocker member 20 is interposed between a shaft supporting portion 3a and one of a pair of parts of the lever holder 5. The knocker member 20 is generally L-shaped in the state shown in the drawing, and the knocker portion 21 is disposed such that a center line C1 in a direction of a width of the shaft supporting portion 3a of the lever, and an axis C2 of the pushrod 15, are coincident. In FIG. 7, the knocker member 20 is schematically presented to indicate its positional relationship with the base portion 3 of the lever 1.

By this arrangement, the pushrod 15 can be operated on the center line C1 of the base portion 3 of the lever even when the knocker member 20 is supported inside the lever holder 5 on a side of the base portion 3 of the lever. Thus, a torsional stress from the pushrod 15 does not tend to be applied to the shaft supporting portion 3a of the lever. Accordingly, the pushrod 15 can operate with a reduced load. In addition, the shaft supporting portion 3a of the lever can have a simple shape which is not a bifurcated shape.

Referring now to FIGS. 8–16, there will be described a fourth embodiment of the invention. This embodiment is different from each of the above-described embodiments in that the knocker portion has a mechanism for preventing disengagement of the pushrod (including coming off thereof), and there is provided a knocker boot. The parts common to this and the above-described embodiments are referred to by the same reference numerals. FIG. 8 corresponds to FIG. 1, and shows a lever unit 40 which is an integration of the lever 1 and the master cylinder 2, and attached to a bar handle 42 for a motorcycle by way of a bolder 41. A grip 43 is disposed at an end portion of the bar handle 42. The lever 1 rotates in two opposite directions A, B from its neutral position N. In the direction A, the lever 1 is rotatable up to a position to have an end of the stopper end 16 and the stopper shoulder 30 in contact with each other. In the direction B, the lever 1 is rotatable up to a position F to contact the grip 43. Reference numeral G denotes a position up to which the lever 1 would be rotatable if the lever 1 does not contact the grip. (This position will be hereinafter referred to as "a limit position G".)

In an enlarged portion 31 extending from an end of the master cylinder 2, a hollow knocker boot 60 is accommodated. Inside the knocker boot 60, a pushrod 15 and a disengagement preventing portion 80 constituting an end portion of the knocker portion 21 are accommodated. As clearly shown in FIGS. 13, 14 and 15, the disengagement preventing portion 80 is bifurcated, whereby it can receive, engage with and hold a head of the pushrod (described later) during the rotation so that it tends not to be disengaged therefrom.

Figure 9A:
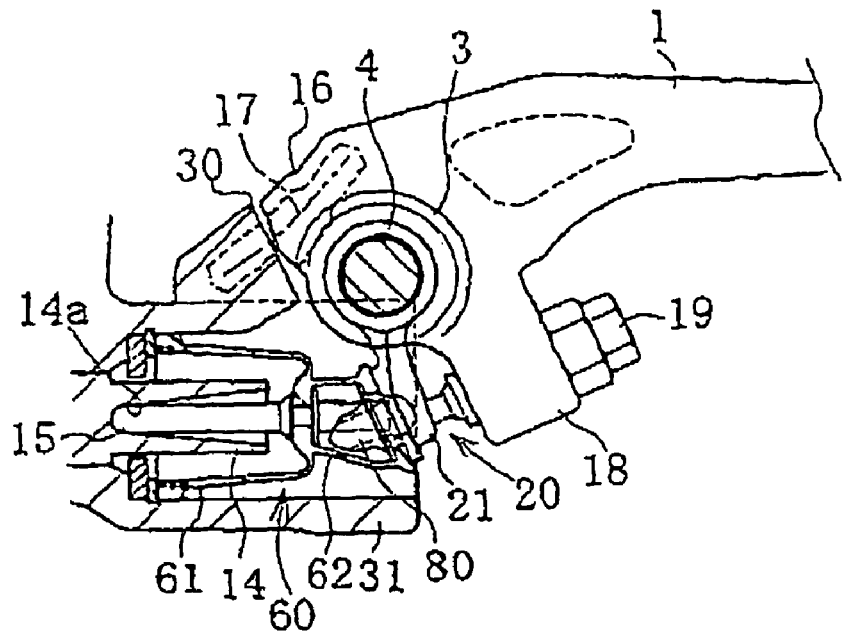
FIG. 9 is a view showing the state of a pushrod and a knocker portion corresponding to the operating position of a lever.
Figure 9B:
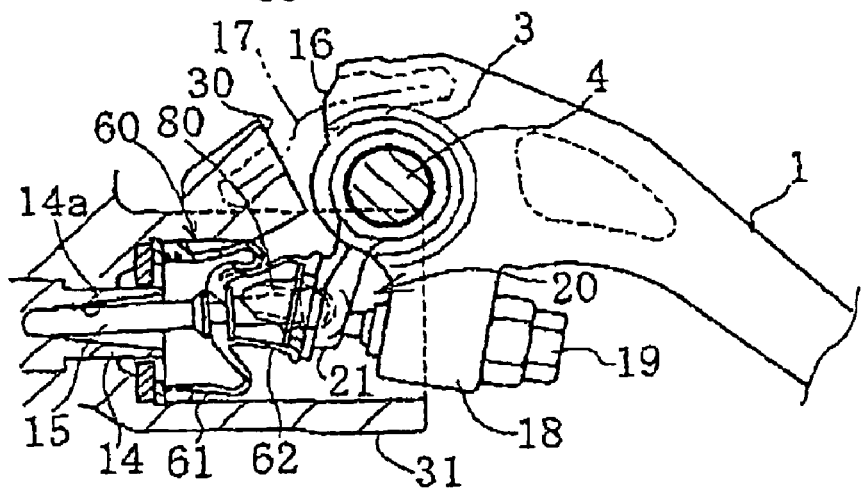
Figure 9C:
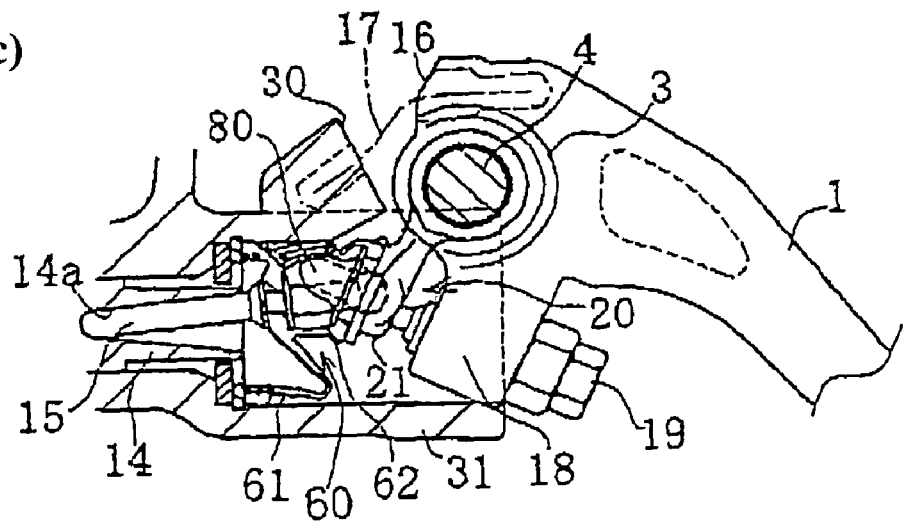

FIG. 9 shows the state of the pushrod 15 and the knocker portion 21 corresponding to the operating position of the lever. In FIG. 9, A, B and C show states of the lever 1 as placed at the neutral position N, position F (shown in FIG. 8), and position G (shown in FIG. 8), respectively. A connecting portion between the pushrod 15 and the knocker portion 21 displaces wobblingly, substantially along an axis of the master cylinder 2 from the neutral position N to the limit position G, during which the connecting portion is covered by the knocker boot 60 and the head of the pushrod 15 tends to not come off of the knocker portion 21 by the disengagement preventing portion 80.

Figure 10:
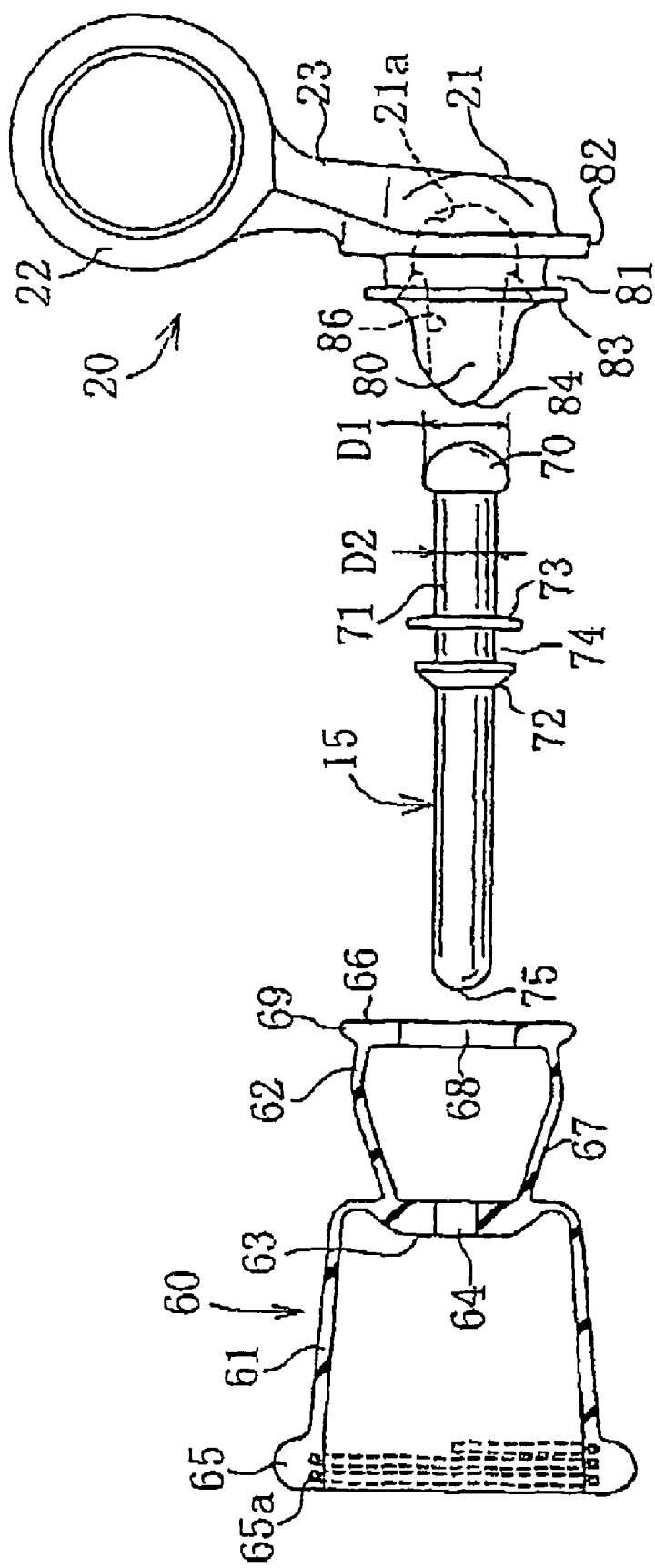
FIG. 10 is a view of a knocker boot, the pushrod, and a knocker member, as exploded.

FIG. 10 shows the knocker boot 60, pushrod 15, and knocker member 20 in an exploded view. The knocker boot 60 is a substantially cylindrical member made of a suitable material having a flexibility and elasticity, such as rubber. The knocker boot 60 is integrally formed by tiering a large-diameter chamber 61 and a small-diameter chamber 62 which has a smaller diameter than that of the large-diameter chamber 61 throughout its length. The large-diameter and small-diameter chambers 61, 62 are separated by a partition wall 63 having at its center a small hole 64 formed therethrough. The thickness around the small hole 64 is larger than that at an outer circumferential portion.

The large-diameter portion 61 is open at its end opposite to the partition wall 63, and an outer circumferential portion of the open end is formed in a bead portion 65 having a large thickness, which is to be fitted in the enlarged portion 31 to be closely fixed there. On the internal side of the bead portion 65, a ring member 65a formed of a looped wire is integrally embedded to keep pressing the bead portion 65 against an internal wall surface of the enlarged portion 31.

The small-diameter chamber 62 has a tapered wall 67 with a diameter gradually increasing toward an end 66 opposite to the partition wall 63. An opening 68 is formed at a center of an end face of the end 66. The diameter of the opening 68 is larger than the small hole 64, and smaller than the opening at the end of the large-diameter chamber 61. An outwardly projecting bead portion 69 is integrally formed at the outer circumferential portion of the end 66, serving to keep the shape at the side of the end 66, as well as facilitate the attaching of the knocker member 20.

The pushrod 15 has at its end a head 70 fitted in a hole 21a of the knocker portion 21 and integrally formed with an axial portion 71. A portion of the head 70 which contacts an internal surface of the hole 21a has a spherical surface. The diameter of the spherical surface is D1, while the external diameter of the axial portion 71 is D2. The axial portion 71 is a straight round bar, having a pair of flanges 72, 73 integrally formed at its intermediate portion. An annular groove 74 is formed between the flanges 72, 73. The other end 75 of the axial portion 71 also has a spherical surface which is held in a slidable contact with an internal surface of a hole 14a.

The thickened portion around the small hole 64 of the partition wall 63 of the knocker boot 60 is fitted in the annular groove 74. That is, the other end 75 of the axial portion 71 is inserted into the small hole 64, and the flange 72, which has an outer circumferential surface tapered down along the direction of the insertion is pushed through the small hole 64, expanding the small hole 64, so that the small hole 64 and a part of the partition wall 63 therearound are fitted in the annular groove 74 to sandwich a fitting portion of the partition wall 63 between the pair of flanges 72 and 73 to unite the knocker boot 60 and the pushrod 15.

The knocker member 20 differs from that of each of the previously described embodiments in that the knocker portion 21 has the disengagement preventing portion 80 and an attaching groove 81 for the knocker boot. The attaching groove 81 is an annular groove which is formed between a pair of flanges 82, 83 formed in an outer circumferential surface of the knocker portion 21, so as to fix an end 66 of the knocker boot 60.

Figure 11:
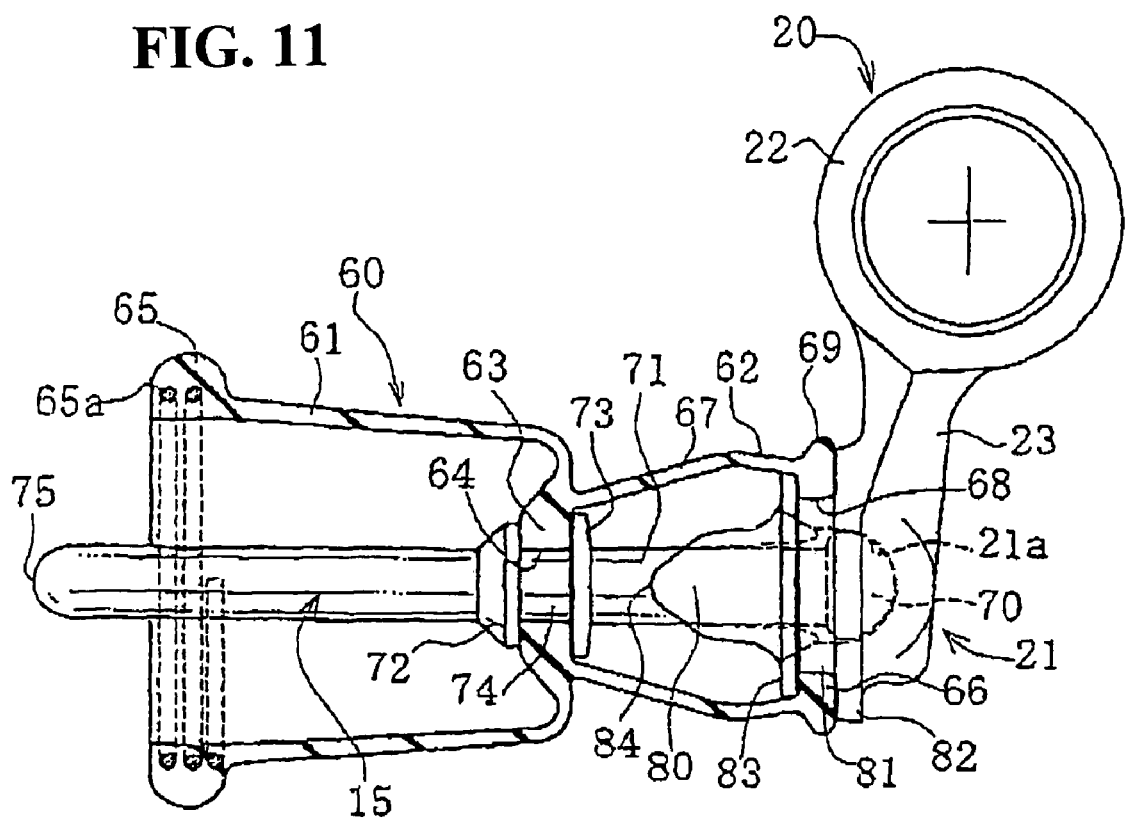
FIG. 11 is a view showing a state where the pushrod and knocker member are covered by the knocker boot.

FIG. 11 shows a state where the pushrod 15 and disengagement preventing portion 80 are covered by the knocker boot 60. The end 66 of the knocker boot 60 is fitted in the attaching groove 81 to be sandwiched between the flanges 82, 83. The disengagement preventing portion 80 enters the small-diameter chamber 62 through the opening 68 to lap a portion of the pushrod 15 on the side of its head in a manner to sandwich the portion.

Figure 12:
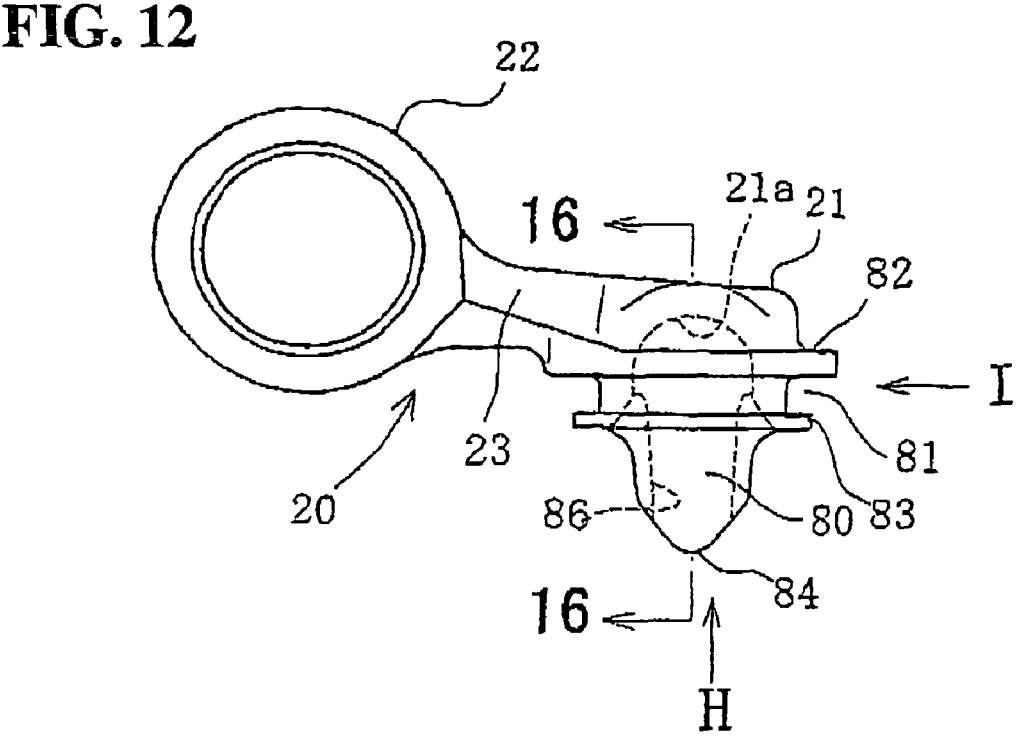
FIG. 12 is an enlarged view of the knocker member.

FIG. 12 is an enlarged view of the knocker portion 20 in which the disengagement preventing portion 80 has a beak-like shape that projects integrally from the knocker portion 21, and an end 84 of the projection that is pointed.

Figure 13:
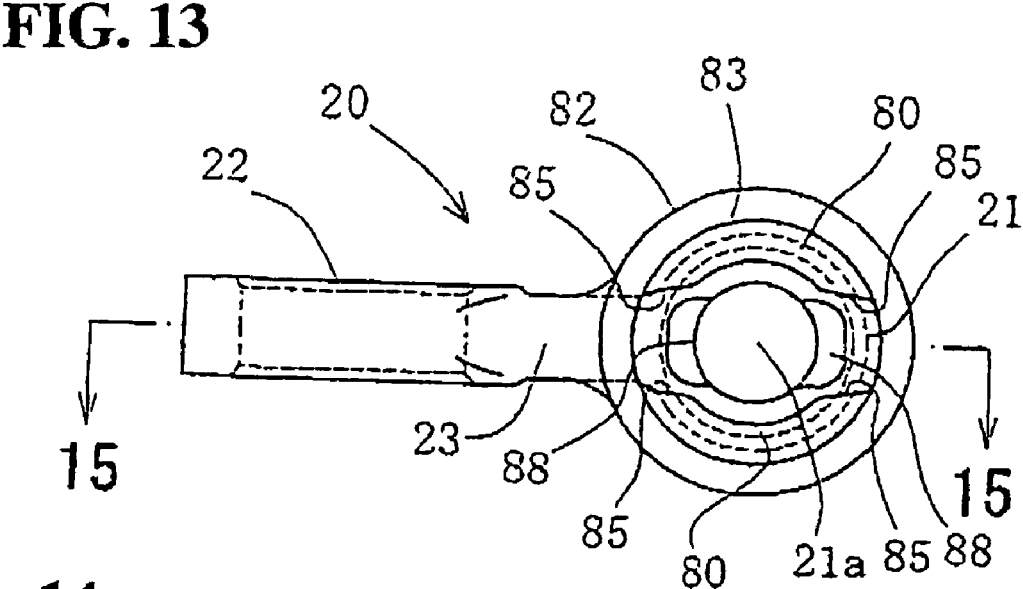
FIG. 13 is a view as seen in a direction indicated by an arrow H in FIG. 12.
Figure 14:
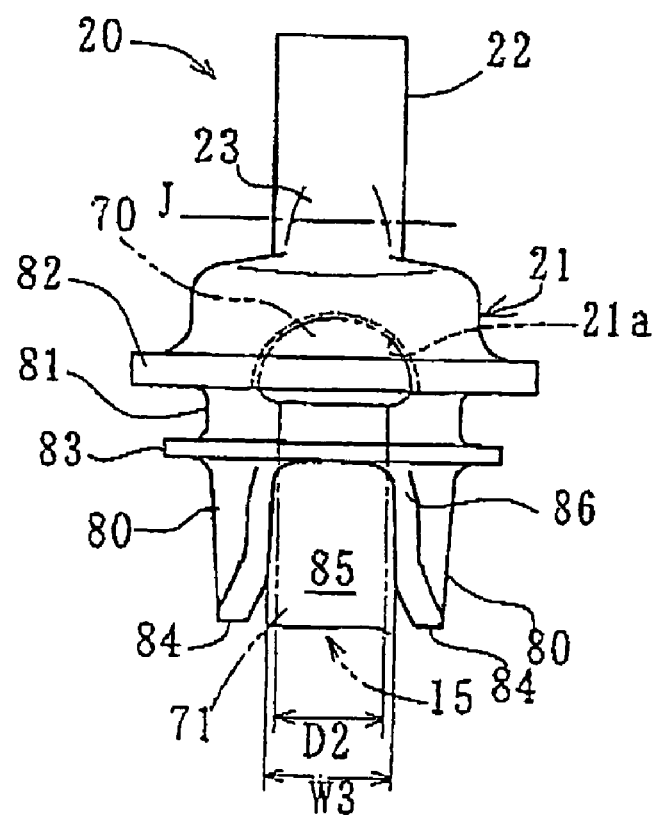
FIG. 14 is a view as seen in a direction indicated by an arrow I in FIG. 12.

FIG. 13 is a view as seen in a direction indicated by an arrow H in FIG. 12, while FIG. 14 is a view as seen in a direction indicated by an arrow I in FIG. 12. As shown in these drawings, the disengagement preventing portion 80 is formed to have a pair of parts opposed to each other with a splitting groove 85 therebetween. The splitting groove 85 has a shape such that a side surface of its cylindrical portion which is partially defined by the disengagement preventing portion 80 is widened to have a width W3 which is slightly wider than an external diameter D2 of the axial portion 71 of the pushrod 15, and in the state as shown in FIG. 13, an end thereof on the side of the end 84 of the projection is open while the other end thereof is a substantially inverse U-shaped to reach a vicinity of the flange 83. In FIG. 14, a rotational axis J is provided around which the knocker member 20 is rotated.

Figure 15:
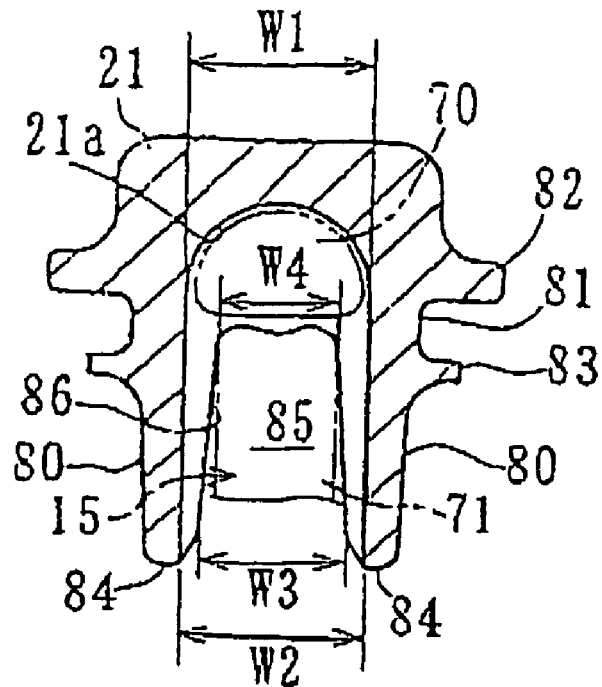
FIG. 15 a cross-sectional view corresponding to a line 15—15 in FIG. 13.

FIG. 15 is a cross-sectional view corresponding to a line 15—15 in FIG. 13. The hole 21a has a concave semispherical surface. A rod insertion path 86 leading to the hole 21a is formed on the side of an internal wall of the disengagement preventing portion 80. End surfaces 87 of the disengagement preventing portion 80 which face the splitting groove 85 are inclined inwardly to narrow the rod insertion path 86. At a connecting portion between each end surface 87 and the hole 21a, there is formed a sway limiting portion 88 which is formed by a tapered stepped portion. The sway limiting portions 88 substantially form an inverse V-like shape, permitting the sway of the pushrod as indicated by an imaginary line.

Figure 16:
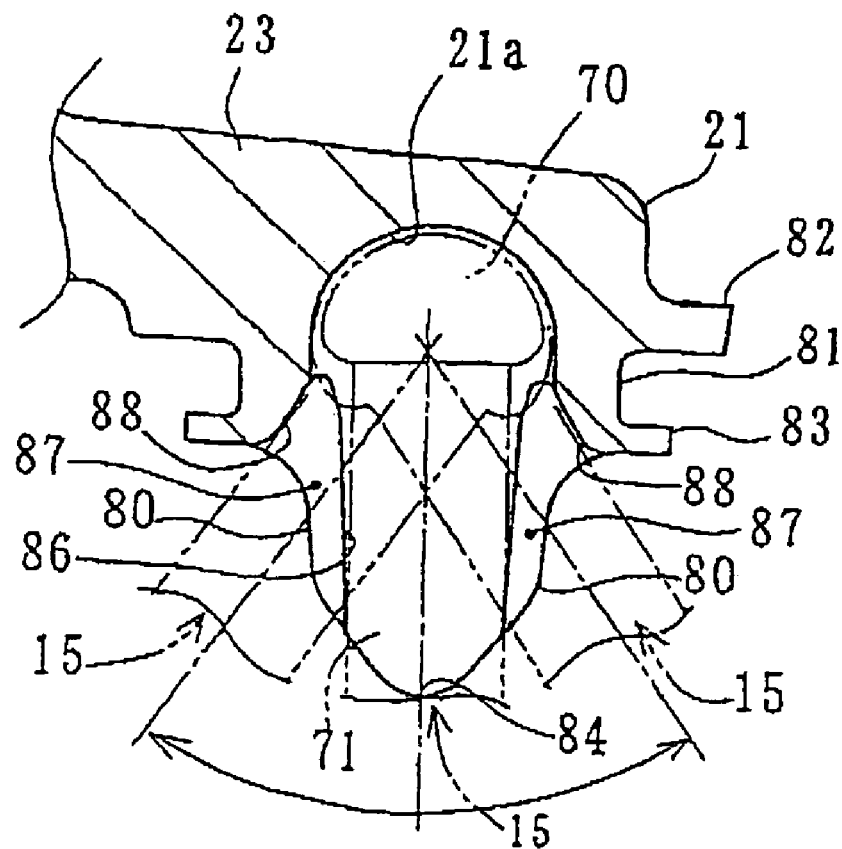
FIG. 16 is a cross-sectional view corresponding to a line 16—16 in FIG. 12.

FIG. 16 is a cross-sectional view corresponding to a line 16—16 in FIG. 12. As is apparent from this drawing, a width W1 corresponding to an internal diameter of the hole 21a is slightly larger than a diameter D1 (FIG. 10) of the head of the pushrod 15. The rod insertion path 86 is formed of a cylindrical bore extending straight in a direction in which the disengagement preventing portion 80 projects, to have a width W2 substantially identical with the width W1 of the hole 21a.

An internal end of the splitting groove 85 on the side of the hole 21a reaches a position between the flanges 82 and 83, and has a minimum width W4 which is slightly larger than an external diameter D2 (FIG. 10) of the axial portion 71.

The following is a description of an operation of the embodiment. As shown in FIGS. 8 and 9, when the lever 1 is rotated, opposite sides of the pushrod 15 in a direction J of an axis of rotational of the knocker member 20, which rotates around a rotational shaft 4, is covered by the disengagement preventing portion 80 with the head 70 loosely fitted in the hole 21a, making the head 70 tending not to be disengaged therefrom (FIG. 14).

The width W3 of the splitting groove 85 is larger than the external diameter D2 of the axial portion 71 but smaller than the diameter D1 of the head 70. Therefore, as shown in FIG. 15, the axial portion 71 of the pushrod 15 is allowed to sway in a left-right direction out of the disengagement preventing portion 80 with the head 70 being a center of the sway, but the head 70 is not released out of the splitting groove 85 even when the amount of the sway becomes large.

In addition, as shown in FIGS. 8, 9 and 11, the pushrod 15 and the disengagement preventing portion 80 are kept covered by the knocker boot 60, it is prevented that a sliding movement inhibiting material, such as dust, adheres to a sliding portion between the head 70 and the disengagement preventing portion 80 and hole 21a and between the hole 14a of the cylindrical holder 14 and the pushrod 15, thus, constantly assuring a good slidability. Further, since the knocker boot 60 covers the entirety of the pushrod 15, the movement of the pushrod 15 in the advancing and retracting direction is kept smooth.

Further, since the knocker boot 60 has a two-tiered structure comprising the small-diameter chamber 62 and large-diameter chamber 61, the small-diameter chamber 62 is easily deformed by being folded to enter the large-diameter chamber 61 as shown in B, C in FIG. 9 and other drawings, when the lever 1 is rotated. Thus, the deformation due to the sway of the pushrod 15 is facilitated, enabling a smooth sway thereof.

The present invention is not limited to the above-described embodiments, but may be otherwise embodied with various changes and modifications and applications. For instance, the invention may be applied to a lever device for generating a hydraulic pressure such as a hydraulic clutch. Further, applications of the present invention are not limited to a lever device attached to a handlebar, but the invention may be applied to a lever device attached to various places on a body of a motorcycle. Still further, applications of the present invention are not limited to a motorcycle, but may be applied to various kinds of vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lever device for a hydraulic operation, comprising:
a piston for linearly moving in a hydraulic cylinder;
a lever operatively supported such that the lever is rotatable relative to the hydraulic cylinder;
an elastic member acting directly between the lever and the hydraulic cylinder for rotationally biasing the lever in a direction to generate hydraulic pressure in the hydraulic cylinder; and
a pushrod disposed to push the piston by being pushed by a pushing portion of the lever as turned, the lever device comprising:
a knocker member for pushing an end of the pushrod, said knocker member being supported to be rotatable with respect to the hydraulic cylinder, wherein the knocker member includes a knocker portion for pushing an end of the pushrod, the knocker portion having a projecting portion for covering a part of the pushrod in a manner to sandwich the part; and
an adjusting mechanism for changing a distance between the knocker member and the pushing portion.

2. The lever device of claim 1, wherein the lever and the knocker member are supported on a same rotational axis.

3. The lever device of claim 1, wherein a pivotal portion of the lever comprises two segments separated in a direction of a rotational axis, and a pivotal portion of the knocker member is interposed between the separated two segments.

4. The lever device of claim 1, wherein the knocker member includes an enlarged end portion in engagement with the pushrod and stopper rings are disposed adjacent to an enlarged diameter portion of the hydraulic cylinder for maintaining the piston therein.

5. The lever device of claim 1, wherein a pivotal portion of the lever includes one segment with the pivotal portion of the knocker member being disposed adjacent to the pivotal portion of the lever.

6. A lever device for a hydraulic operation, comprising:
a piston for linearly moving in a hydraulic cylinder;
a lever operatively supported such that the lever is rotatable relative to the hydraulic cylinder;
a pushrod disposed to push the piston by being pushed by a pushing portion of the lever as turned, the lever device comprising:
a knocker member for pushing an end of the pushrod, said knocker member (1) being supported to be rotatable with respect to the hydraulic cylinder and (2) including a knocker portion for pushing an end of the pushrod, the knocker portion having a bifurcated projecting portion for covering a part of the pushrod in a manner to sandwich the part; and
an adjusting mechanism for changing a distance between the knocker member and the pushing portion.

7. The lever device of claim 6, wherein the lever and the knocker member are supported on a same rotational axis.

8. The lever device of claim 6, wherein a pivotal portion of the lever comprises two segments separated in a direction of a rotational axis, and a pivotal portion of the knocker member is interposed between the separated two segments.

9. The lever device of claim 6, wherein an elastic member rotationally biases the lever in a direction to generate pressure in the hydraulic cylinder, the elastic member being disposed between the lever and the hydraulic cylinder.

10. The lever device of claim 6, wherein the knocker member includes an enlarged end portion in engagement with the pushrod and stopper rings are disposed adjacent to an enlarged diameter portion of the hydraulic cylinder for maintaining the piston therein.

11. The lever device of claim 6, wherein a pivotal portion of the lever includes one segment with the pivotal portion of the knocker member being disposed adjacent to the pivotal portion of the lever.

* * * * *